United States Patent [19]
Moulton

[11] Patent Number: 5,550,724
[45] Date of Patent: Aug. 27, 1996

[54] ELECTROD HOUSING AND CAP ASSEMBLY

[76] Inventor: Herbert F. Moulton, 4525 W. Marlette, Glendale, Ariz. 85301

[21] Appl. No.: 311,203

[22] Filed: Sep. 23, 1994

[51] Int. Cl.⁶ .................................................. F21V 31/02
[52] U.S. Cl. ........................ 362/267; 362/217; 362/263; 362/457; 313/318.10; 174/50.5; 174/50.57
[58] Field of Search ...................... 313/318.03, 318.09, 313/318.10; 439/521, 523; 174/74 R, 84 R, 87, 50.5, 50.51, 50.52, 50.53, 50.54, 50.57; 362/216, 217, 221, 226, 263, 265, 267, 457; 40/545

[56] References Cited

U.S. PATENT DOCUMENTS

| 1,951,502 | 3/1934 | Cadieux | 362/265 |
| 2,018,991 | 10/1935 | Blackwood | 362/217 |
| 2,270,492 | 1/1942 | Badalewski | 362/263 |
| 4,739,012 | 4/1988 | Hagman | 525/92 |
| 4,842,535 | 6/1989 | Velke, Sr. et al. | 362/217 |
| 4,969,282 | 11/1990 | Eberlart | 40/545 |
| 5,008,787 | 4/1991 | Sklar et al. | 362/221 |
| 5,045,000 | 9/1991 | Trame et al. | 40/545 |

*Primary Examiner*—Denise L. Gromada
*Assistant Examiner*—Alan B. Cariaso
*Attorney, Agent, or Firm*—Richard R. Mybeck; Peter B. Scull

[57] ABSTRACT

A housing and cap assembly for insulating and making watertight the electrical connection between a neon tube electrode and its associated power cable in an inert gas or neon sign system having a housing member with cylinders for containing a power cable and a neon electrode integrally formed in a parallel, double back configuration within a unified structure and having an cap member through which the cable and electrode are inserted which is also coactive with the housing member to form a weatherproof, watertight seal about the electrical power cable, electrode connection.

11 Claims, 1 Drawing Sheet

ELECTROD HOUSING AND CAP ASSEMBLY

The present invention relates generally to electrode housings and cap assemblies and more particularly to a watertight electrode housing and cap assembly formed in a unified structure, double back configuration and made from a material having a high dielectric constant, a high thermal resistivity, and the capability of protecting high voltage inert gas (principally neon) sign components from water, ultraviolet light, heat, and dimensional instability caused by environmental exposure.

BACKGROUND OF THE INVENTION

The development of inert gas filled lighting displays or sign systems (hereinafter referred to generally as "neon signs") of various kinds has evolved to include the installation of neon signs in many locations that are subject to adverse weather conditions such as humidity, rain, snow, high winds, temperature extremes and prolonged exposure to ultraviolet and infrared degradation from sunlight. Other environmental hazards include infestations of dust or insects, and decomposition due to interaction with ozone. Further, the excitation of the inert gas or neon disposed within the display tubing requires high voltages (2000–15,000 volts) which contributes to system deterioration by the generation of heat (including burning, melting, or arcing) and the potential for combustion inside the housings that contain the connections of power (or GTO) cables to neon tube electrodes.

Also, neon electrode tubing and associated power cables are often required to be doubled back over themselves in order to eliminate "black spots" in the continuity of the displayed message. This doubling back often causes cracking in the cable insulation which thereby creates safety hazards due to the exposure of the bare electrical conductors carrying high voltages and the potential for damaging electrical shorts. Such bare exposures are also a violation of the National Electrical Code (N.E.C.) Article 600.

Therefore, the neon sign industry needs a sturdy, protective housing and cap assembly for receiving and containing the connections between power supply cables and associated neon tube electrodes, particularly when double back installations are desired for the integrity of a particular installation. Furthermore, such assemblies should be made from materials which resist high ultraviolet light and ozone, have dimensional stability under stress, high insulative and heat resistive values and which permit the utilization of less costly components in the erection of a sign assembly. Still further, such housing designs must incorporate features that will permit the complete sealing of the housing and cap assembly into a weatherproof, watertight unit as defined by the N.E.C. and as required for listing with Underwriter Laboratories (UL) or the Canadian Standards Association (CSA). Lastly, it is even more desirable to create an airtight or hermetically sealed assembly without the use of additional sealants. It is toward these goals that the present disclosure is directed.

BRIEF SUMMARY OF THE PRESENT INVENTION

The present invention relates generally to means for providing insulated, watertight, weatherproof protection for a neon tube electrode, its associated power supply cable and the electrical connection between the supply power cable and the neon tube electrode as is required to permit the outdoor installation of the associated neon lighting structures.

More particularly, the present invention comprises a neon tube electrode housing and cap assembly having a housing member with two cylindrical portions defined therein for receiving and containing a power supply cable, a neon tube electrode and the electrical connection therebetween. Further, such cylindrical portions are integrally formed in a parallel, double back configuration within the unified structure of the housing member. The assembly of the present invention also has a cap member through which the cable and electrode are sealingly inserted. The cap member further coacts with the housing member to form an air-tight chamber and a weatherproof, watertight seal about the electrical power cable and electrode connection by the novel coaction of flange which is integrally formed on the housing member into a correspondingly shaped channel which is formed in the cap member.

Accordingly, a principal object of the present invention is to provide a new and improved means for encasing and protecting a double back connection of a power supply cable to a neon tube electrode for neon sign systems.

Another object of the present invention is to provide an electrode housing and cap assembly that will completely seal in a watertight, weatherproof frictional engagement, an electrode, its associated electrical power supply cable, and the electrical connection therebetween regardless of environmental conditions and prohibit the entry of electrical contaminants thereunto.

A still further object of the present invention is to proved a new and improved electrode cap and housing assembly which when installed in a new and improved electrode cap and housing assembly, which when installed in a neon-light system provides, an air-tight hermetically-sealed chamber to house the electrode-power cable electrical connection and a thermal insulation barrier between the power cable and the electrode.

These and still further objects as shall hereafter appear are fulfilled by the present invention in a remarkably unexpected fashion as will be readily discerned from the following detailed description of an exemplary embodiment of the present invention especially when read in conjunction with the accompanying drawings in which like parts bear like numerals throughout the several views.

DESCRIPTION OF PREFERRED EMBODIMENTS

Figure 8:
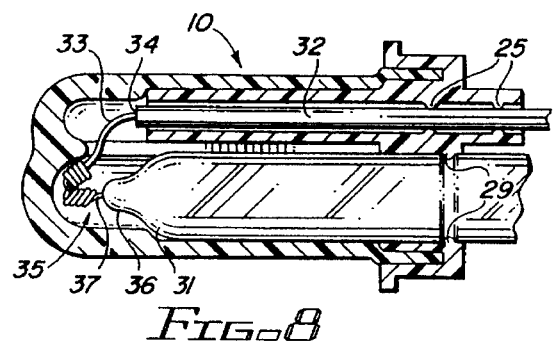
FIG. 8 is a view of the assembly of FIG. 7 having a power cable, a neon electrode, and the electrical connection therebetween operatively disposed therein.

The present invention relates to an electrode housing and cap assembly identified in the drawings by the general reference 10 which is operative, as shown in FIG. 8, to enclose and protect the electrical connection of an inert gas or neon tube electrode 31 with an electrical power supply or GTO cable 32 in all weather conditions as will be hereinafter described in detail.

Figure 1:
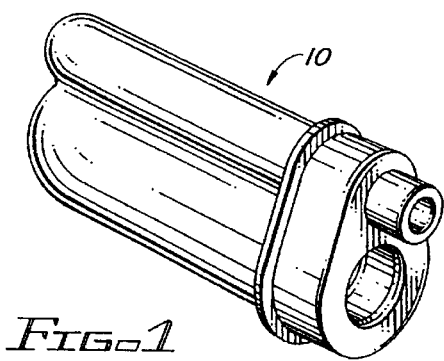
FIG. 1 is an isometric view of an electrode housing and cap assembly embodying the present invention.
Figure 2:
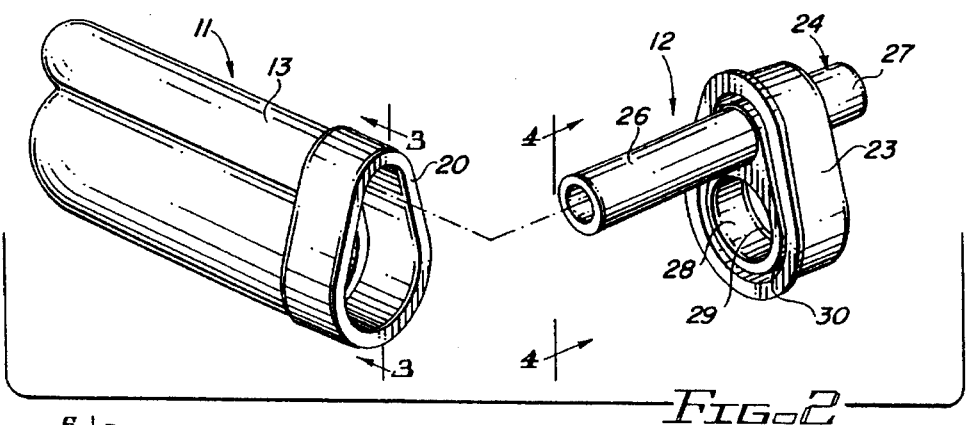
FIG. 2 is an exploded view of the component members of the electrode housing and cap assembly of FIG. 1.

Referring to FIGS. 1 and 2, electrode housing and cap assembly 10 comprises a housing member 11 and a cap member 12, each of which is constructed of a heat resistant, ozone and ultraviolet light resistant material such as DuPont's blend of ALCRYN® and HYTREL® or a like material, which provides protection from the deleterious actions of the sun and weather while also providing dimensional stability for assembly 10. Further, this material coacts with the preferred structural shapes of members 11, 12 as described below to provide a frictional, watertight fit to completely insulate the electrical connection from any influx of water or other undesirable electrical contaminants such as dust, insects, and the like.

Figures 3, 5, 6:
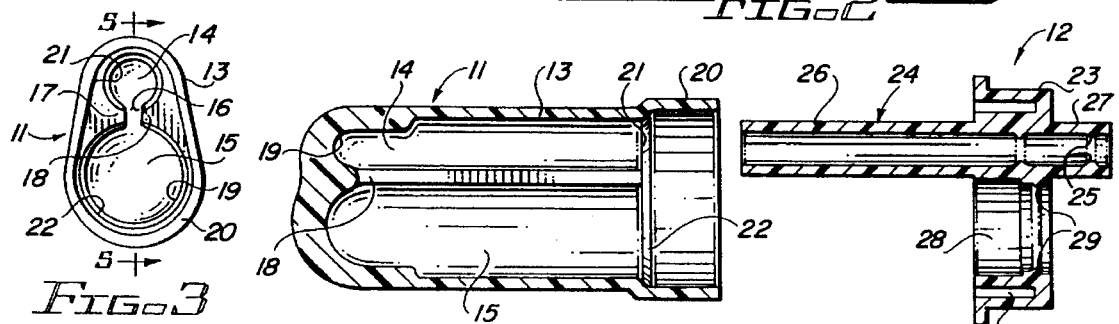
FIG. 3 is a cross-sectional view of the housing member of FIG. 2 taken on line 3—3 of FIG. 2.
FIG. 5 is a cross-sectional view of the housing member of FIG. 3 taken on line 5—5 of FIG. 3.
FIG. 6 is a cross-sectional view of the cap member of FIG. 4 taken on line 6—6 of FIG. 4.

Housing member 11 comprises a curved body portion 13 composed of an upper hollow cylinder 14 and a slightly larger, lower hollow cylinder 15 defined therein in parallel, adjoining communicative relationship to each other as shown in FIG. 3. Cylinders 14, 15 are in direct communication with each other via slotted opening 16 defined between inwardly protruding ledges 17, 18. The preferred embodiment also comprises a slightly thickened end portion 19 as shown in FIGS. 3 and 5 to enhance heat resistance and insulation at the site of the electrical connection described below. As shown particularly in FIGS. 2 and 3, a substantially pyriform or pear-shaped flange portion 20 which is slightly wider than body portion 13 is integrally formed with body portion 13 and extends outwardly therefrom in circumscription about mouths 21, 22 of cylinders 14, 15, respectively.

Figure 4:
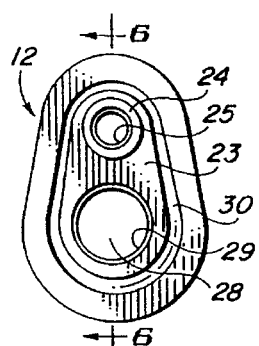
FIG. 4 is a cross-sectional view of the cap member of FIG. 2 taken on line 4—4 of FIG. 2.

As shown in FIGS. 2 and 4, cap member 12 of assembly 10 has a pear-shaped body portion 23 disposed between two substantially pyriform or pear-shaped parallel surfaces which define a channel 30, the purpose of which is hereinafter described, and which generally confirms in contour to pear-shaped flange portion 20 of housing member 11. Cap member 12 also has a hollow tubular portion 24 extending through pear-shaped body portion 23 as shown in FIGS. 2 and 6. Tubular portion 24 comprises at least one but preferably two O-rings 25 integrally formed therewithin to provide a frictional, sealing engagement as further described below. Tubular portion 24 is integrally attached to body portion 23 such that it displays a long inner segment 26 for insertion into cylinder 14 and an outer segment 27.

Figure 7:
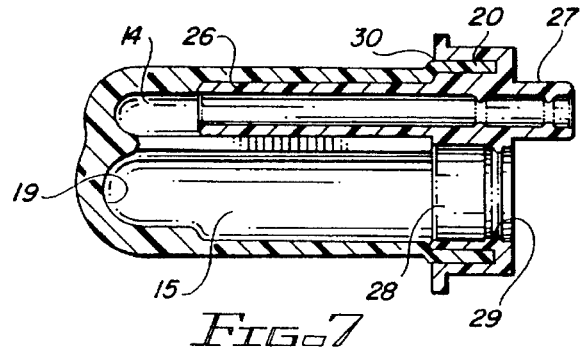
FIG. 7 is a cross-sectional view of the electrode housing and cap assembly as the cap member of FIG. 6 is shown inserted in the housing member of FIG. 5.

Pear-shaped body portion 23 is a substantially solid component having hollow openings defined therethrough by tubular portion 24 (described above) and cylindrical passage 28, and further includes a pear-shaped channel 30 formed therein as shown best in FIGS. 2 and 4. Passage 28 has at least one O-ring 29 integrally formed therein as shown in FIGS. 4 and 6 and is sized for corresponding connection with cylinder 15 of housing member 11 in cooperative relationship therewith to sealingly receive the insertion of a neon tube electrode 31 therein. O-ring 29 provides the means for forming a watertight, frictional sealing engagement with electrode 31. Tubular portion 24 is similarly hollow to sealingly receive the insertion of a power or GTO cable 32 therethrough. O-rings 25 provide the means for forming a watertight, frictional sealing engagement with cable 32, as shown in FIG. 8. Channel 30 is sized to frictionally receive correspondingly sized flange portion 20 of housing member 11 therewithin to form the means for a weatherproof, watertight frictional sealing engagement of housing member 11 with cap member 12 as shown in FIG. 7.

FIG. 8 shows assembly 10 with electrode 31 and cable 32 inserted therein and operatively connected to each other. A bare wire 33 extends from leading end 34 of cable 32 to connecting means 35. Connecting means 35 may be any of a plurality of well-known electrically conductive connections either presently in use or yet to be developed. These may include for example, wire-to-wire splices connecting bare wire 33 with a wire 37 protruding from nose portion 36 of electrode 31, as shown in FIG. 8, or may include spring connectors (not shown) which are merely connected to bare wire 33 and positioned to contact the electrically conductive nose portion 36 of electrode 31.

Electrode housing and cap assembly 10 is ideally made from a thin (approximately 1/16 inch), flexible material having a relative thermal index (RTI) of greater than 105° C. (reflecting exemplary long term degradation protection), a flame rating of at least 94–5 V., and the capability of retaining these properties over a wide range of operating temperatures. An example of such a material is the blend of HYTREL® polyester elastomer with ALCRYN® melt processible rubber manufactured by the E.I. DuPont Co., Wilmington, Del. A description of this material and its production is described in U.S. Pat. No. 4,739,012, (Hagman) and is incorporated herein by this reference thereto. This blend of HYTREL® and ALCRYN® has been found to have all of the attributes desired herein. Other materials having similar properties may also be employed herein when desired.

To use this blend in forming the component members of assembly 10, an injection molding process is employed. Thus, housing member 11 and cap member 12 are separately injection molded into the corresponding structural shapes described above. Further, assembly 10 is readily adjustable to accommodate all of the neon tube electrodes and power cables currently approved for use in the sign industry by the simple expediency of varying, during the molding process, the inside diameters of hollow cylinders 14, 15, tubular portion 24, and passage 28. Watertight sealing engagements (or airtight or hermetical in certain situations) between assembly 10, electrode 31, and power cable 32 are thereby ensured by the proper mold sizing of these components of assembly 10, particularly so that integrally formed O-rings 25 and 29 frictionally and sealingly engage the desired electrode 31 and power cable 32. Note also that so long as sufficient space is left available, a slightly thickened end portion 19 is molded into the preferred embodiment to provide even more electrical and thermal insulation in the area where it is needed most; i.e. immediately adjacent electrical connecting means 35 and wires 33 and 37.

To use assembly 10, cap member 12 is first separated from housing member 11 substantially as shown in FIG. 2. Then, leading end 34 of a power supply (such as G.T.O.) cable 32 is sealingly inserted into cap member 12 through the outer segment 27 end of tubular portion 24 and pushed through tubular portion 24 until leading end 34 of cable 32 emerges from inner segment 26. Again, suitable O-rings 25 are employed to frictionally and sealingly engage cable 32. An adequate quantity of cable 32 is then pulled through tubular portion 24 so that when completely assembled, a proper electrical connection as shown in FIG. 8 is created.

Bare wire 33 is exposed by stripping the insulation from cable 32 at leading end 34 either before or after inserting cable 32 through cap member 12 as just described. A sufficient portion of bare wire 33 is exposed so that when fully assembled, bare wire 33 extends from cylinder 14 through slotted opening 16 and into cylinder 15 for connection to electrode 31 with connection means 35 as shown in FIG. 8 and described in further detail below.

In the step-by-step process of preparing assembly 10 for use, it is preferable to securely connect bare wire 33 to wire 37 protruding from nose portion 36 of electrode 31 by connection means 35 before housing member 11 is attached to cap member 12. Thus, nose portion 36 of electrode 31 is sealingly inserted in and passed through passage 28 and is engaged with O-ring 29, either immediately before or after cable 32 is properly positioned in tubular portion 24. Then, bare wire 33 is conductively attached to electrical wire 37 via connection means 35, which as shown in the preferred embodiment in FIG. 8, is a wire-to-wire splice. A typical, favorable splice is the "Western Union" or Lineman's splice which involves the crossing of bare wire 33 with wire 37 and then winding or coiling each about the other in opposite directions to render it virtually impossible to unintentionally disconnect bare wire 33 from wire 37. Thus, as positioned in cap member 12, a conventional electrical connection of power cable 32 with electrode 31 is formed in a desirable double back configuration.

To complete the watertight assembly, cap member 12, with both electrode 31 and cable 32 properly disposed therein and connected as described above, is inserted into housing member 11. Thus, cap member 12 is slid into or telescopically inserted in housing member 11 with bare wire 33 and connection means 35 leading the way. Bare wire 33 is introduced into slotted opening 16 while connection means 35 is inserted in mouth 22 of cylinder 15. Next, cap member 12 is pushed further inward so that power cable 32 and tubular portion 24 may then be passed through mouth 21 into cylinder 14 and electrode 31 may likewise be simultaneously passed through mouth 22 into cylinder 15. Finally, members 11, 12 are then pushed together until flange 20 is firmly and frictionally press fit into channel 30 as shown in FIG. 8.

Thus, assembly 10 is fully assembled and a completely sealed, weatherproof, watertight connection has been achieved between power cable 32 and electrode 31 and a substantially air-tight chamber has been defined within the assembly. Subsequently, the free end of power cable 32 can be attached to a power source (not shown) to activate the inert or neon gas to produce a brilliant lighting display.

Flange portions 16, 17 of housing member 11 coact with power cable 32 to assure that cable 32 never comes into physical contact with electrode 31 which, when the neon signage with which assembly 10 is activated, operates at a temperature of 62°–88° C. and could otherwise disintegrate the insulation on cable 32. This aspect has the unexpected benefit of allowing the sign contractor to safely employ less expensive GTO cable which is rated at 60° C. than the 105° C. cable heretofore deemed necessary.

The terms "watertight" and "weatherproof" as used herein are in accord with the generally accepted definitions appearing in Article 100 of the National Electrical Code, namely:

Watertight: So constructed that moisture will not enter the enclosure under specified test conditions.

Waterproof: So constructed or protected that exposure to the weather will not interfere with successful operation. (FPN) Rainproof, raintight or watertight equipment can fulfill the requirements for weatherproof where varying weather conditions other than wetness, such as snow, ice, dust, or temperature extremes, are not a factor.

From the foregoing, it is readily apparent that a new and useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A housing and cap assembly for use with inert gas tube signage comprising:

a housing member having a body portion, said body portion having a larger and a smaller hollow cylinder integrally formed therein in generally parallel relationship to each other, and channel means extending between said cylinders in communicative relationship thereto, said larger cylinder adapted to receive and secure an inert gas tube electrode therein, said smaller cylinder adapted to receive and contain a power supply cable therein, said channel means adapted to receive and secure therein an electrical connection operatively interposed between said electrode and said power supply cable;

a cap member having a body portion, a hollow tubular portion extending through and outwardly from said body portion, a cylindrical passage extending through said body portion; and means securing said cap member to said housing member in which said cylindrical passage is in registry with said larger cylinder and said tubular member is telescopically disposed within said smaller cylinder.

2. A housing and cap assembly for use with inert gas tube signage comprising:

a housing member having a body portion, said body portion having a larger and a smaller hollow cylinder integrally formed therein in generally parallel relationship to each other, and channel means extending between said cylinders in communicative relationship thereto, said larger cylinder adapted to receive and secure an inert gas tube electrode therein, said smaller cylinder adapted to receive and contain a power supply cable therein, said channel means adapted to receive and secure therein an electrical connection operatively interposed between said electrode and said power supply cable;

a cap member having a body portion, a hollow tubular portion extending through and outwardly from said body portion, a cylindrical passage extending through said body portion;

means securing said cap member to said housing member in which said cylindrical passage is in registry with said larger cylinder and said tubular member is telescopically disposed within said smaller cylinder;

means operatively inserted within said tubular member to form a watertight seal between said housing member and said cap member about said electrical connection;

means forming a watertight, frictional sealing engagement between said larger cylinder and an electrode inserted therein; and means forming a watertight, frictional sealing engagement between said tubular portion of said cap member and a power supply cable inserted therethrough.

3. An electrode housing and cap assembly according to claim 2 in which said cap member has a pear-shaped channel defined therein and said housing member has a like shaped flange integrally formed thereon which, when inserted into said channel, forms a watertight seal therewith.

4. An electrode housing and cap assembly according to claim 2 in which said means forming a watertight, frictional sealing engagement between said larger cylinder and said electrode comprises an O-ring operatively inserted therebetween.

5. An electrode housing and cap assembly according to claim 2 in which said means forming a watertight, frictional sealing engagement between said tubular portion and said power supply cable comprises an O-ring integrally formed within said tubular portion for sealed circumscription about said power supply cable.

6. An electrode housing and cap assembly according to claim 1 in which said electrical connection between said electrode and said power supply cable is a wire-to-wire splice.

7. An electrode housing and cap assembly according to claim 2 in which said electrical connection between said electrode and said power supply cable is a wire-to-wire splice.

8. An electrode housing and cap assembly according to claim 1 in which said electrical connection between said electrode and said power supply cable is a spring connection.

9. An electrode housing and cap assembly according to claim 2 in which said electrical connection between said electrode and said power supply cable is a spring connection.

10. An electrode housing and cap assembly according to claim 2 in which said body portion is thicker adjacent said electrical connection than it is adjacent said cap member.

11. A high voltage inert gas sign system comprising an inert gas tube, an inert gas tube electrode integrally formed with said inert gas tube, a power supply cable, an electrical connection operatively interposed between said electrode and said power supply cable; and a doubled back, watertight electrode housing and cap assembly operatively disposed about said electrode, said electrical connection and a portion of said power supply cable in frictional, sealing engagement therewith.

* * * * *